US009611769B2

(12) United States Patent
Pierik et al.

(10) Patent No.: US 9,611,769 B2
(45) Date of Patent: Apr. 4, 2017

(54) SYSTEM AND METHOD FOR CONTROLLING AIRFLOW THROUGH A VENTILATION SYSTEM OF AN ENGINE WHEN CYLINDERS OF THE ENGINE ARE DEACTIVATED

(71) Applicant: GM Global Technology Operations LLC, Detroit, MI (US)

(72) Inventors: Ronald J. Pierik, Holly, MI (US); Thomas A. Spix, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1024 days.

(21) Appl. No.: 13/804,349

(22) Filed: Mar. 14, 2013

(65) Prior Publication Data
US 2014/0277996 A1 Sep. 18, 2014

(51) Int. Cl.
*F01M 13/00* (2006.01)
*F02D 41/00* (2006.01)
*F02D 13/06* (2006.01)
*F02M 25/06* (2016.01)
*F02D 13/02* (2006.01)

(52) U.S. Cl.
CPC .......... *F01M 13/00* (2013.01); *F02D 13/06* (2013.01); *F02D 41/008* (2013.01); *F02D 13/0219* (2013.01); *F02D 2250/08* (2013.01); *F02M 25/06* (2013.01); *Y02T 10/18* (2013.01)

(58) Field of Classification Search
CPC .......... F01M 13/00; F01M 2013/0077; F01M 2013/0083; F01M 2013/0088; F01M 2013/0094; F01M 13/022; F01M 13/021; F02D 13/06; F02D 41/008; F02D 13/0219; F02D 2250/08; F02D 41/0087; F02D 17/02; F02D 17/00; F02D 41/2464; Y02T 10/18; F02M 25/06; F01L 2013/001
USPC .... 701/102; 123/41.86, 198 F, 198 DB, 572, 123/679, 574, 520
See application file for complete search history.

(56) References Cited

U.S. PATENT DOCUMENTS

| 4,721,090 | A | * | 1/1988 | Kato | F01L 1/0532 |
| | | | | | 123/41.86 |
| 4,760,833 | A | * | 8/1988 | Tatyrek | F01M 13/023 |
| | | | | | 123/572 |
| 4,856,487 | A | * | 8/1989 | Furuya | F01M 13/023 |
| | | | | | 123/574 |
| 5,331,940 | A | * | 7/1994 | Takayama | F02D 41/061 |
| | | | | | 123/572 |

(Continued)

FOREIGN PATENT DOCUMENTS

JP 2005127213 A * 5/2005
JP 2006274931 A * 10/2006
(Continued)

*Primary Examiner* — Sizo Vilakazi
*Assistant Examiner* — Brian Kirby

(57) ABSTRACT

A system according to the principles of the present disclosure includes an airflow determination module and a cylinder activation module. The airflow determination module determines an amount of airflow through a ventilation system for a crankcase of an engine. The cylinder activation module, when a cylinder of the engine is deactivated while the engine is running, selectively activates the cylinder based on the amount of airflow through the ventilation system.

20 Claims, 4 Drawing Sheets

(56) References Cited

U.S. PATENT DOCUMENTS

| | | | | |
|---|---|---|---|---|
| 5,458,095 | A | * | 10/1995 | Post .................... C25B 1/04 123/3 |
| 6,439,174 | B1 | * | 8/2002 | Shea .................. F02M 25/06 123/41.86 |
| 6,575,022 | B1 | * | 6/2003 | Schneider ............. F01M 13/00 73/114.01 |
| 6,694,948 | B2 | * | 2/2004 | Glugla ............... F01L 13/0005 123/198 F |
| 6,779,516 | B1 | * | 8/2004 | Shureb ................. F01M 1/18 123/572 |
| 7,040,719 | B2 | * | 5/2006 | Collins ................. B60T 13/72 303/114.3 |
| 7,080,547 | B2 | * | 7/2006 | Beyer .................. F01M 11/10 73/114.01 |
| 7,171,960 | B1 | * | 2/2007 | Hagari ............... F02D 41/0042 123/472 |
| 7,278,391 | B1 | | 10/2007 | Wong et al. |
| 7,331,334 | B2 | * | 2/2008 | Leone ................. F02M 25/08 123/516 |
| 7,431,023 | B2 | * | 10/2008 | Kavanagh ........... F01M 13/022 123/572 |
| 7,567,867 | B2 | * | 7/2009 | Herz ................... F01M 11/10 123/572 |
| 7,826,987 | B2 | * | 11/2010 | Aikawa ............... F01M 11/10 123/196 R |
| 7,900,611 | B2 | * | 3/2011 | Okada ............... F01M 13/0011 123/572 |
| 7,996,141 | B2 | * | 8/2011 | Pache ................. F01M 13/022 123/572 |
| 8,887,559 | B2 | * | 11/2014 | Kuhn .................. F02D 41/22 73/114.33 |
| 2003/0054704 | A1 | * | 3/2003 | Kanno .................. B63H 21/21 440/1 |
| 2005/0155562 | A1 | * | 7/2005 | Taxon ................... F01M 13/00 123/41.86 |
| 2005/0161023 | A1 | * | 7/2005 | Albertson ........... F02D 41/0087 123/399 |
| 2006/0144378 | A1 | * | 7/2006 | Zillmer .................. F02D 17/02 123/679 |
| 2007/0056560 | A1 | * | 3/2007 | Trask ....................... F01L 9/04 123/435 |
| 2007/0156322 | A1 | * | 7/2007 | Soga ...................... F02D 41/16 701/104 |
| 2007/0235005 | A1 | * | 10/2007 | Lewis ....................... F01L 9/04 123/322 |
| 2008/0041336 | A1 | * | 2/2008 | Gibson ................. F02D 13/04 123/322 |
| 2009/0230761 | A1 | * | 9/2009 | Sekiguchi ............... B60T 8/442 303/2 |
| 2009/0273230 | A1 | * | 11/2009 | Wang ....................... B60K 6/48 303/122.09 |
| 2010/0076664 | A1 | * | 3/2010 | Monros ................. F01M 13/00 701/102 |
| 2010/0192925 | A1 | * | 8/2010 | Sadakane ................. F01L 1/34 123/520 |
| 2012/0285421 | A1 | * | 11/2012 | Cunningham .......... B60T 17/02 123/436 |
| 2013/0206111 | A1 | * | 8/2013 | Riepl .................. F02D 41/3845 123/478 |
| 2014/0061391 | A1 | | 3/2014 | Ffield et al. |

FOREIGN PATENT DOCUMENTS

JP 2009228529 A * 10/2009 ......... F02D 41/2464
WO WO-2011142859 A1 11/2011

* cited by examiner

SYSTEM AND METHOD FOR CONTROLLING AIRFLOW THROUGH A VENTILATION SYSTEM OF AN ENGINE WHEN CYLINDERS OF THE ENGINE ARE DEACTIVATED

FIELD

The present disclosure relates to systems and methods for controlling airflow through a ventilation system of an engine when cylinders of the engine are deactivated.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Under some circumstances, one or more cylinders of an engine may be deactivated to decrease fuel consumption. For example, one or more cylinders may be deactivated when the engine can produce a requested amount of torque while the cylinder(s) are deactivated. Deactivation of a cylinder may include disabling opening of intake and exhaust valves of the cylinder and disabling spark and fueling of the cylinder.

SUMMARY

A system according to the principles of the present disclosure includes an airflow determination module and a cylinder activation module. The airflow determination module determines an amount of airflow through a ventilation system for a crankcase of an engine. The cylinder activation module, when a cylinder of the engine is deactivated while the engine is running, selectively activates the cylinder based on the amount of airflow through the ventilation system.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
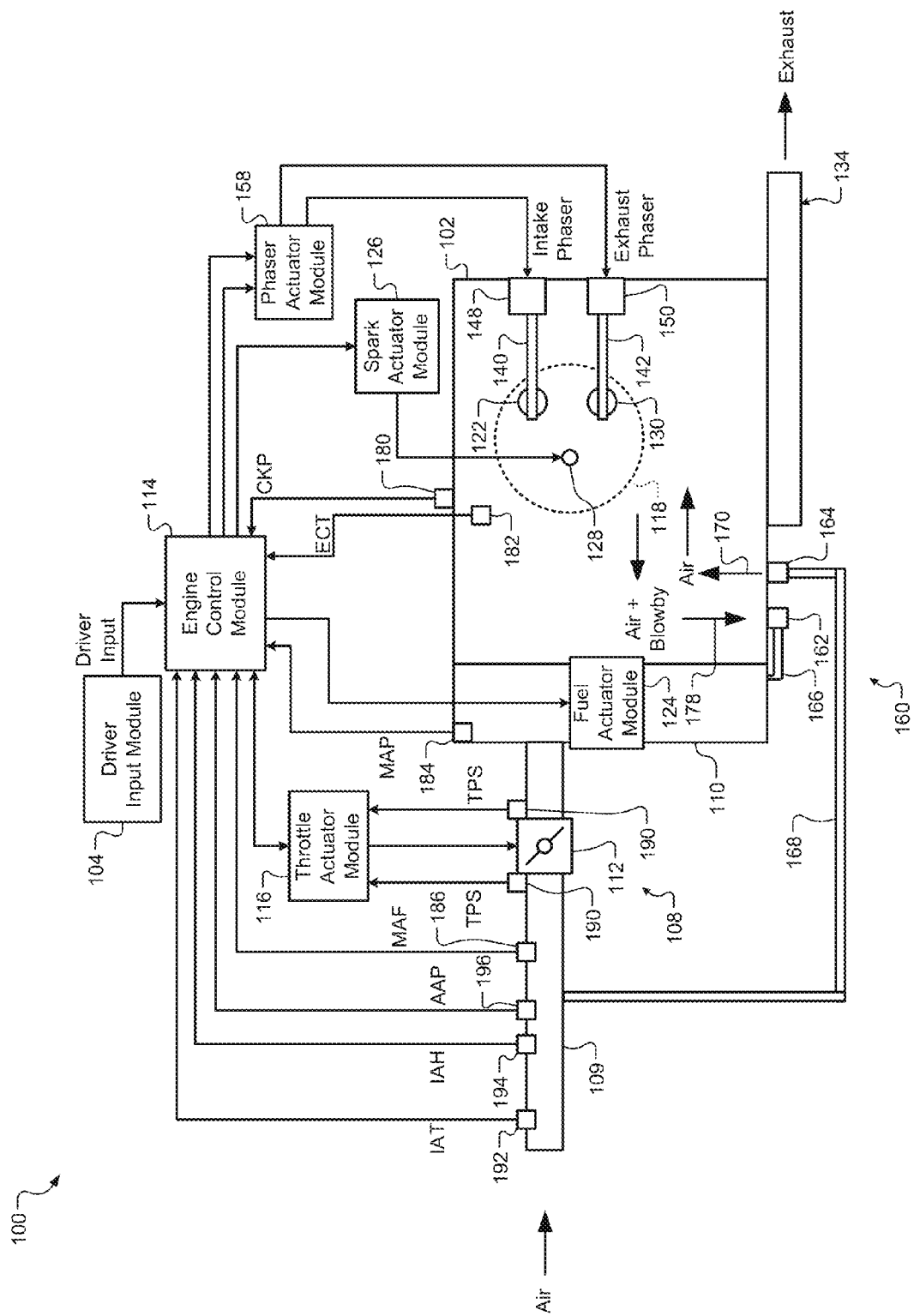
FIG. 1 is a functional block diagram of an example engine system according to the principles of the present disclosure.

During operation of an engine, unburned fuel and exhaust gas within a cylinder may escape around piston rings and enter a crankcase of the engine. The unburned fuel and exhaust gas that escapes may be referred to as blowby or foul air. The exhaust gas typically includes water vapor and emissions such as hydrocarbon, nitrogen oxide, and carbon monoxide. The presence of nitrogen oxide within the crankcase may lead to nitration of oil, which may react with water vapor to form sludge. The sludge may cause engine damage by, for example, preventing lubrication.

A crankcase ventilation system may be used to prevent a buildup of foul air within a crankcase of an engine. Fresh air may be drawn through a ventilation system from an intake system at a location upstream from an intake manifold. The ventilation system introduces the fresh air into the crankcase, where the fresh air mixes with blowby. The air/blowby mixture is vented to the intake system through the ventilation system, drawn into cylinders of the engine, and combusted. In this manner, airflow through the ventilation system may prevent a buildup of foul air within the crankcase.

In certain engine operating conditions, the amount of airflow through a ventilation system may be insufficient to prevent a buildup of foul air in a crankcase. For a given throttle opening area greater than zero, the amount of airflow through the ventilation system depends on a difference between ambient pressure and pressure within the intake manifold, referred to as engine vacuum. As airflow through the intake manifold increases, the pressure within the intake manifold may decrease and engine vacuum may increase, which may cause the amount of airflow through the ventilation system to increase. As airflow through the intake manifold decreases, the pressure within the intake manifold may increase and engine vacuum may decrease, which may cause the amount of airflow through the ventilation system to decrease.

The buildup of foul air within a crankcase may be of particular concern for engines that frequently operate at high load, such as engines equipped with a boost device (e.g., a turbocharger, a supercharger) and/or a cylinder deactivation system. An engine typically operates at high load when cylinders of the engine are deactivated since the amount of airflow required for each remaining activated cylinder increases. When an engine operates at high load, a throttle valve of the engine is typically at or near wide open throttle. Consequently, the pressure within the intake manifold is at or near ambient pressure, the engine vacuum is relatively low, and the amount of airflow through the ventilation system is relatively low. This may lead to a buildup of foul air within a crankcase, which may cause sludge formation and, ultimately, engine damage.

A system and method according to the present disclosure activates one or more cylinders of an engine based on an amount of airflow through a ventilation system of the engine. When cylinders are activated, an opening area of a throttle valve may be decreased to maintain the same level of torque output. In turn, engine vacuum increases, which increases the amount of airflow through the ventilation system. Increasing the amount of airflow through the ventilation system prevents foul air buildup within a crankcase of the engine.

The amount of airflow through the ventilation system may be adjusted to maintain a level of nitrogen oxide within the crankcase less than a predetermined level (e.g., 500 parts per million (ppm)). In one example, the system and method activates cylinders when the amount of airflow through the ventilation system is less than a predetermined amount for a predetermined period. In another example, the system and method activates cylinders when the amount of airflow through the ventilation system during the predetermined period is less than a desired amount. The desired amount may be determined based on environmental conditions such as ambient temperature, ambient humidity, and/or engine wear (e.g., number of hours of engine operation).

Figure 2:
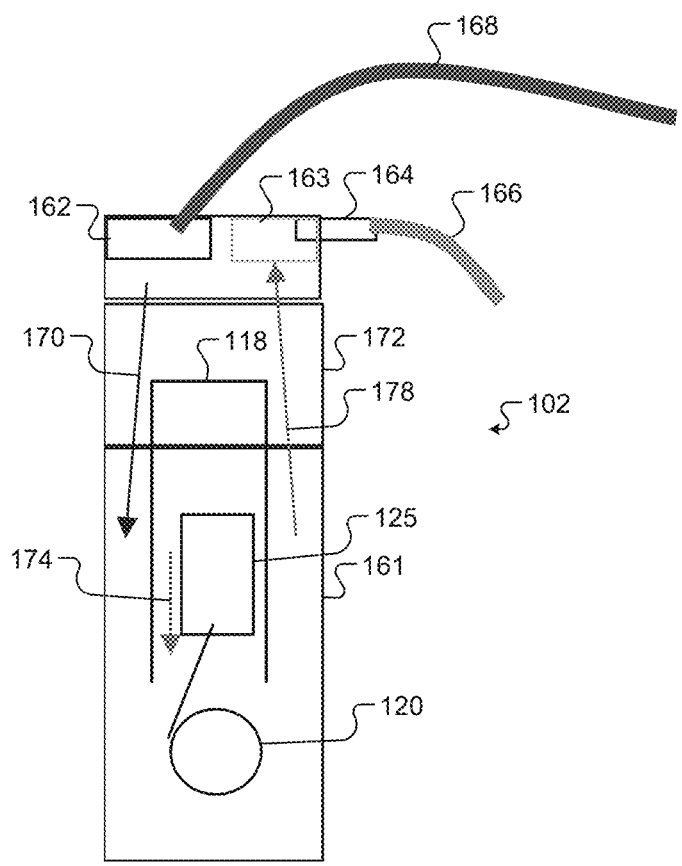
FIG. 2 is a section view of a portion of the example engine system of FIG. 1.

Referring to FIGS. 1 and 2, an engine system 100 includes an engine 102 that combusts an air/fuel mixture to produce drive torque for a vehicle. The amount of drive torque produced by the engine 102 is based on driver input from a driver input module 104. Air is drawn into the engine 102 through an intake system 108. The intake system 108 includes an intake duct 109, an intake manifold 110, and a throttle valve 112. The throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may selectively deactivate some or all of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft 120 (FIG. 2) of the engine 102, two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston 125 (FIG. 2) within the cylinder 118 compresses the air/fuel mixture. The engine 102 is depicted as a spark-ignition engine. A spark actuator module 126 energizes a spark plug 128 in the cylinder 118 based on a signal from the ECM 114, which ignites the air/fuel mixture. The timing of the spark may be specified relative to the time when the piston 125 is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102. Alternatively, the spark actuator module 126 may vary the spark timing relative to TDC by different amounts for cylinders of the engine 102 to optimize combustion within the cylinders.

During the combustion stroke, the combustion of the air/fuel mixture drives the piston 125 down, thereby driving the crankshaft 120. The combustion stroke may be defined as the time between the piston 125 reaching TDC and the time at which the piston 125 returns to bottom dead center (BDC). During the exhaust stroke, the piston 125 begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The ECM 114 may deactivate the cylinder 118 by disabling opening of the intake valve 122 and/or the exhaust valve 130. In various implementations, the intake valve 122 and/or the exhaust valve 130 may be controlled by devices in addition to or other than camshafts, such as electromagnetic or hydraulic valve actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake cam phaser 148 and the exhaust cam phaser 150 based on signals from the ECM 114. When implemented, variable valve lift and/or other valve actuators may also be controlled by the valve actuator module 158.

The engine system 100 includes a ventilation system 160 that circulates fresh air from the intake duct 109 through a crankcase 161 (FIG. 2) of the engine 102 to prevent a buildup of foul air within the crankcase 161. The ventilation system 160 includes air/oil separators 162, 163, a positive crankcase ventilation (PCV) flow regulator 164, a first vent line 166 extending between the PCV flow regulator 164 and the intake manifold 110, and a second vent line 168 extending between the intake duct 109 and the air/oil separator 162. In the example shown, the second vent line 168 extends from the intake duct 109 at a location that is upstream from the intake manifold 110 and the throttle valve 112. In various implementations, the air/oil separator may serve as a cam cover and/or the PCV flow regulator 164 may include an orifice and/or a valve.

Fresh air may be drawn from the intake duct 109, through the second vent line 168, and to the air/oil separator 162. Fresh air 170 from the air/oil separator 162 may then flow through a cylinder head 172 (FIG. 2) of the engine 102 and to the crankcase 161 of the engine 102, where the fresh air 170 mixes with blowby 174 (FIG. 2). Blowby is unburned fuel and exhaust gas that escapes past piston rings and enters a crankcase. The air/blowby mixture 178, referred to as foul air, may be vented to the intake system 108 through the air/oil separator 163, the PCV flow regulator 164, and the first vent line 166, and then drawn into cylinders of the engine 102 and combusted.

For a given throttle opening area greater than zero, the amount of airflow through the ventilation system 160 (e.g., through the PCV flow regulator 164) depends on a difference between ambient pressure and pressure within the intake manifold 110, referred to as engine vacuum. As airflow through the intake manifold 110 increases, the pressure within the intake manifold 110 may decrease and engine vacuum may increase, which may cause the amount of airflow through the ventilation system 160 to increase. As airflow through the intake manifold 110 decreases, the pressure within the intake manifold 110 may increase and engine vacuum may decrease, which may cause the amount of airflow through the ventilation system 160 to decrease.

The position of the crankshaft 120 may be measured using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator.

The pressure within the intake manifold 110 may be measured using a manifold absolute pressure (MAP) sensor 184. In various implementations, engine vacuum may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ambient humidity of air being drawn into the engine 102 may be measured using an intake air humidity (IAH) sensor 194. The pressure of ambient air may be measured using an ambient air pressure (AAP) sensor 196. The ECM 114 may use signals from the sensors to make control decisions for the engine system 100.

Figure 3:
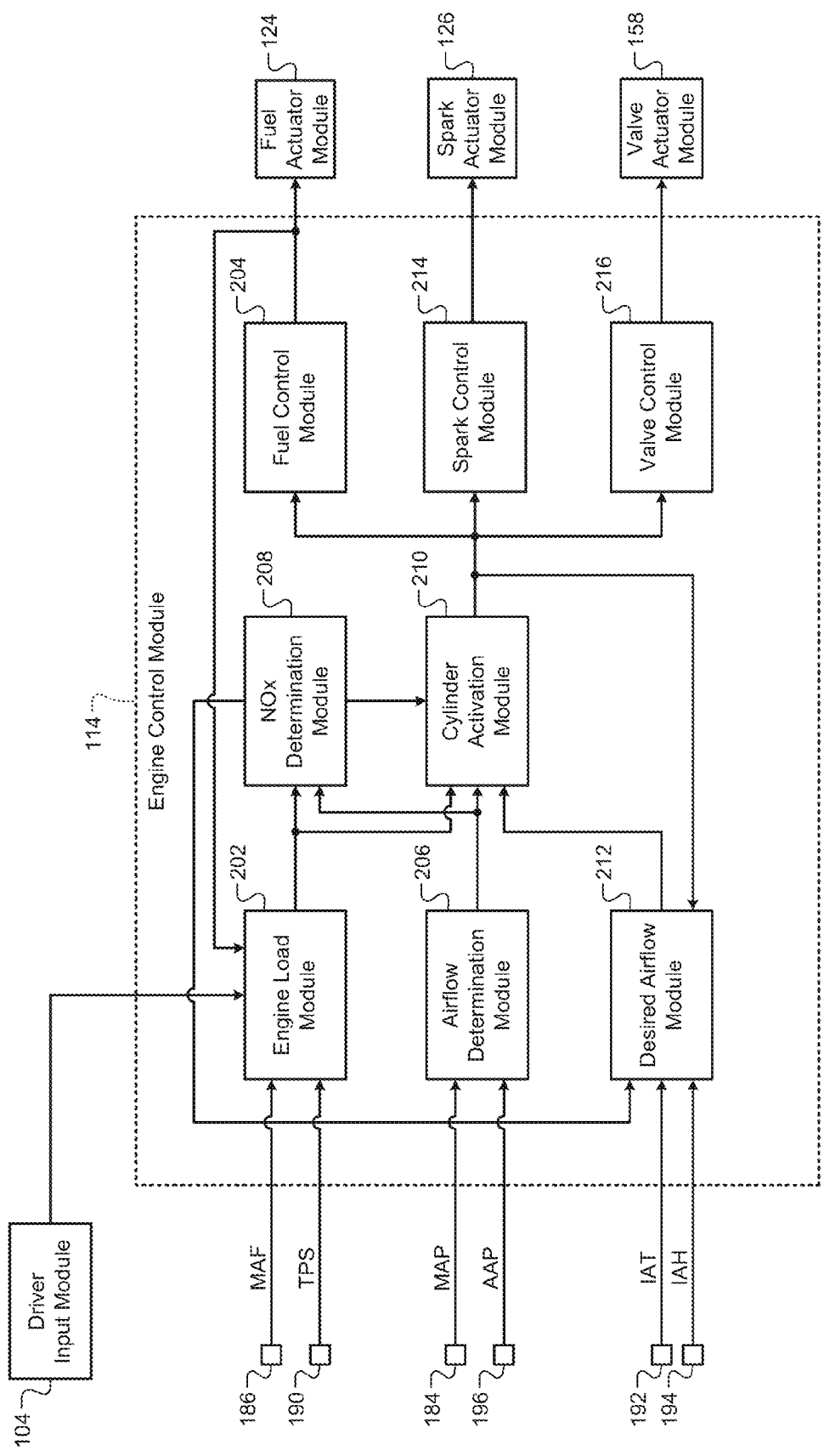
FIG. 3 is a functional block diagram of an example control system according to the principles of the present disclosure.

Referring to FIG. 3, an example implementation of the ECM 114 includes an engine load module 202 that determines engine load. The engine load module 202 may determine engine load based on the driver input from the driver input module 104, the mass airflow rate from the MAF sensor 186, the throttle position from the TPS sensor 190, and/or a fueling rate from a fuel control module 204. The engine load module 202 may determine that the engine load increases when the mass airflow rate increases, when a change in the throttle position corresponds to a throttle area increase, and/or when the fueling rate increases. Conversely, the engine load module 202 may determine that the engine load decreases when the mass airflow rate decreases, when a change in the throttle position corresponds to a throttle area decrease, and/or when the fueling rate decreases.

The engine load module 202 may determine a driver torque request based on the driver input and determine the engine load based on the driver torque request. The engine load module 202 may determine that the engine load increases when the driver torque request increases and that the engine load decreases when the driver torque request decreases. The driver input may be based on a position of an accelerator pedal. The driver input may also be based on input from a cruise control system, which may be an adaptive cruise control system that varies vehicle speed to maintain a predetermined following distance. The engine load module 202 may store one or more mappings of accelerator pedal position to desired torque, and may determine the driver torque request based on a selected one of the mappings. In various implementations, the driver torque request may be determined by a torque request module. The engine load module 202 outputs the engine load and may output the driver torque request.

An airflow determination module 206 determines an amount of airflow through the ventilation system 160. The airflow determination module 206 may determine the amount of airflow through the ventilation system 160 based on the difference between ambient pressure and the manifold pressure from the MAP sensor 184, referred to as engine vacuum. The airflow determination module 206 may receive the ambient pressure from the AAP sensor 196 or may assume that the ambient pressure is equal to a predetermined value (101 kPa). Alternatively, the airflow determination module 206 may estimate the ambient pressure based on other environmental conditions such as ambient temperature and/or elevation.

The airflow determination module 206 may estimate a mass flow rate of air flowing through the ventilation system 160 based on the engine vacuum. The airflow determination module 206 may then determine the amount of airflow through the ventilation system 160 based on the mass flow rate of air flowing through the ventilation system 160 and the corresponding period. The airflow determination module 206 may determine that the mass flow rate of air flowing through the ventilation system 160 increases when the engine vacuum increases. The airflow determination module 206 may determine that the mass flow rate of air flowing the ventilation system 160 decreases when the engine vacuum decrease.

In various implementations, the airflow determination module 206 may receive the mass flow rate of air flowing through the ventilation system 160 from a mass flow rate sensor disposed in the ventilation system 160. For example, a mass flow rate sensor may be disposed in the second vent line 168 between the intake system 108 and the air/oil separator 162. The airflow determination module 206 outputs the amount of airflow through the ventilation system 160.

A nitrogen oxide (NOx) estimation module 208 estimates a level of nitrogen oxide within the crankcase 161 of the engine 102. The NOx estimation module 208 may estimate the nitrogen oxide level based on an amount of nitrogen oxide that enters the crankcase 161 due to blowby and an amount of nitrogen oxide that exits the crankcase 161 through the ventilation system 160. The NOx estimation module 208 may estimate the amount of nitrogen oxide that enters the crankcase 161 based on the engine load and/or the engine speed, as well as the corresponding period(s). The NOx estimation module 208 may estimate the amount of nitrogen oxide that exits the crankcase 161 based on the amount of airflow through the ventilation system 160. The NOx estimation module 208 outputs the nitrogen oxide level.

A cylinder activation module 210 may deactivate cylinders in the engine 102 based on the driver torque request. The cylinder activation module 210 may deactivate one or more (e.g., all) cylinders in the engine 102 when the engine 102 can satisfy the driver torque request while the cylinder(s) are deactivated. The cylinder activation module 210 may reactivate the cylinders when the engine 102 cannot satisfy the driver torque request while the cylinder(s) are deactivated. The cylinder activation module 210 outputs the quantity of activated cylinders.

When one or more cylinders of the engine 102 are deactivated while the engine 102 is running, the cylinder activation module 210 selectively activates one or more of the deactivated cylinders based on the amount of airflow through the ventilation system 160. In one example, the cylinder activation module 210 activates cylinders when the amount of airflow through the ventilation system 160 is less than a first amount for a first period. The first period may be a predetermined period (e.g., from 15 minutes to 30 minutes). The first amount may be a predetermined amount (e.g., an amount corresponding to a mass flow rate of air from 0.5 grams per second (g/s) to 1.0 g/s during the first period).

In another example, the cylinder activation module 210 activates cylinders when the amount of airflow through the ventilation system 160 during the first period is less than a desired amount. The cylinder activation module 210 may not activate cylinders to increase the amount of airflow through the ventilation system 160 when the engine is unable to provide additional intake airflow through the ventilation system 160. The airflow determination module 206 may predict the amount of airflow through the ventilation system 160 when cylinder(s) are activated, and the cylinder activation module 210 may activate the cylinder(s) when the predicted amount of airflow through the ventilation system is greater than a second amount.

A desired airflow module 212 determines the desired amount of airflow through the ventilation system 160 during the first period. The desired airflow module 212 may determine the desired amount of airflow based on environmental conditions such as the ambient temperature from the IAT sensor 192 and the ambient humidity from the IAN sensor 194. The desired airflow module 212 may increase the desired amount of airflow when the ambient temperature decreases and/or when the ambient humidity increases. The desired airflow module 212 may decrease the desired amount of airflow when the ambient temperature increases and/or when the ambient humidity decreases.

The desired airflow module 212 may determine the desired amount of airflow based on an amount of engine wear and/or a number of hours of engine operation after a most recent oil change. The desired airflow module 212 may increase the desired amount of airflow when the amount of engine wear increases and/or when the number of hours of engine operation after the most recent oil change increases. The desired airflow module 212 may use a total number of hours of engine operation as an approximation of the amount of engine wear. The desired airflow module 212 may determine the total number of hours of engine operation based on input from the cylinder activation module 210. For example, the desired airflow module 212 may increment a timer when at least one cylinder of the engine 102 is activated.

The desired airflow module 212 may determine the desired amount of airflow through the ventilation system 160 based on the nitrogen oxide level within the crankcase 161. The desired airflow module 212 may adjust the desired amount of airflow through the ventilation system 160 to maintain the nitrogen oxide level less than a predetermined level (e.g., 500 ppm). For example, the desired airflow module 212 may increase the desired amount of airflow to a value that is greater than the actual amount of airflow through the ventilation system 160 when the nitrogen oxide level is greater than the predetermined level. In turn, the cylinder activation module 210 may activate one or more cylinders of the engine 102 when the nitrogen oxide level is greater than the predetermined level. The desired airflow module 212 outputs the desired amount of airflow through the ventilation system 160.

The fuel control module 204 instructs the fuel actuator module 124 to provide fuel to a cylinder of the engine 102 to execute a firing event in the cylinder. The fuel control module 204 may instruct the fuel actuator module 124 to stop providing fuel to a cylinder when the cylinder is deactivated. A spark control module 214 instructs the spark actuator module 126 to generate spark in a cylinder of the engine 102 to execute a firing event in the cylinder. The spark control module 214 may instruct the spark actuator module 126 to stop generating spark in a cylinder when the cylinder is deactivated. A valve control module 216 instructs the valve actuator module 158 to open intake and exhaust valves of a cylinder to execute a firing event in the cylinder. The valve control module 216 may instructs the valve actuator module 158 to stop opening intake and exhaust valves of a cylinder when the cylinder is deactivated.

Figure 4:
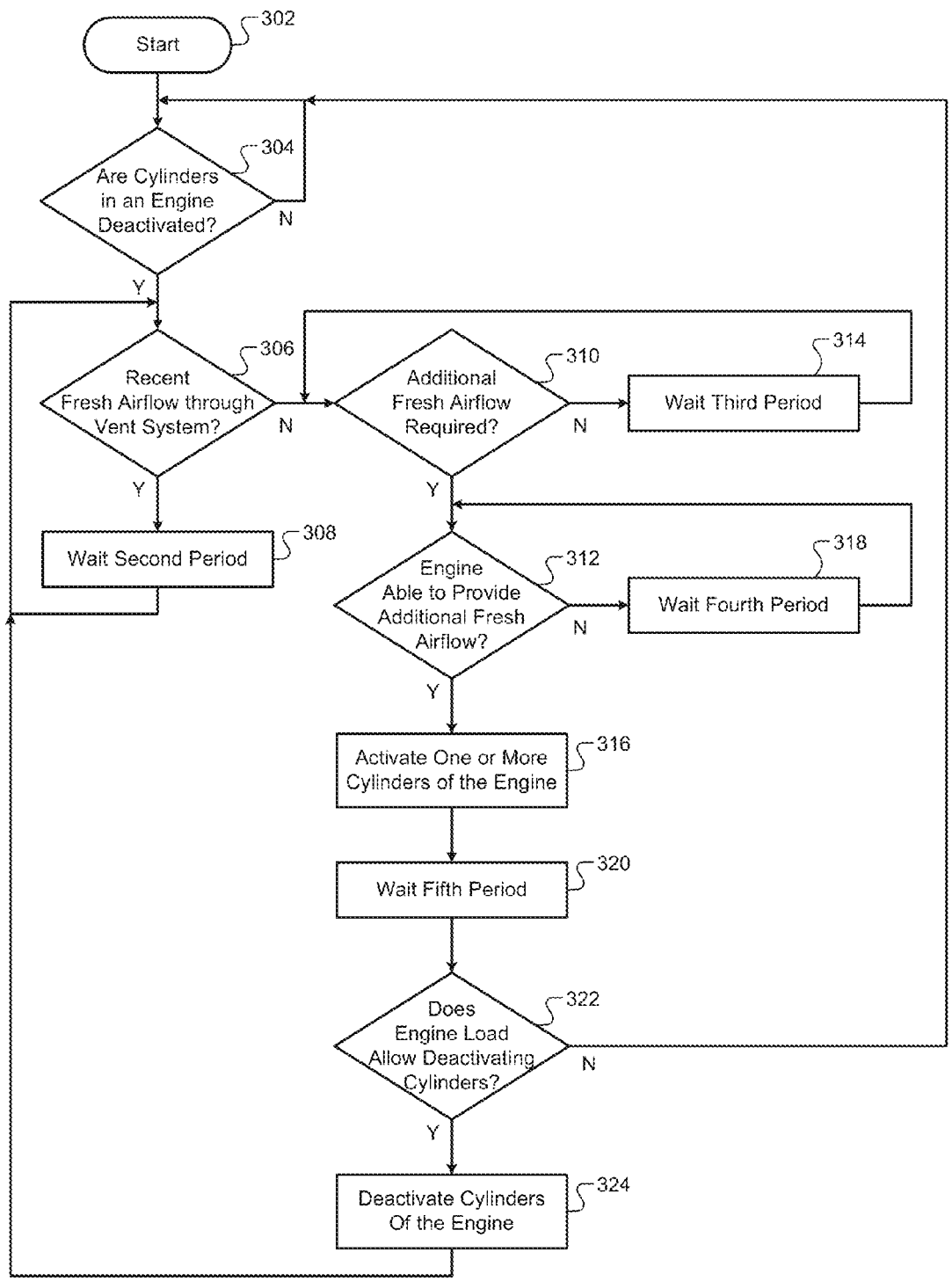
FIG. 4 is a flowchart illustrating an example control method according to the principles of the present disclosure.

Referring to FIG. 4, a method for controlling airflow through a ventilation system for a crankcase of an engine begins at 302. At 304, the method determines whether one or more cylinders of the engine are deactivated while the engine is running (e.g., while one or more other cylinders of the engine are activated). The method may deactivate cylinder(s) of the engine when the engine can satisfy a driver torque request while the cylinder(s) are deactivated. If one or more cylinders of the engine are deactivated while the engine is running, the method continues at 306.

At 306, the method determines whether fresh intake air has recently flowed through the ventilation system. The method may also determine whether the amount of intake air that has recently flowed through the ventilation system is adequate to prevent a buildup of foul gas in the crankcase. In one example, the method may determine whether the amount of airflow through the ventilation system during a first period (e.g., from 15 to 30 minutes) is greater than a first amount (e.g., an amount corresponding to a mass flow rate from 0.5 g/s to 1 g/s). Conversely, the method may determine whether an amount of air greater than the first amount has flowed through the ventilation system within a period that is less than the first period. If intake air has recently circulated through the ventilation system, the method continues at 308. Otherwise, the method continues at 310. At 308, the method waits for a second period (e.g., 30 seconds) before continuing at 306

In various implementations, at 306, the method may determine whether the amount of airflow through the ventilation system is less than the first amount for the first period. In these implementations, the method may continue to 310 when the amount of airflow through the ventilation system is less than the first amount for the first period. Otherwise, the method may continue at 308.

The method may determine the amount of airflow through the ventilation system 160 based on a difference between ambient pressure and a pressure within an intake manifold of the engine, referred to as engine vacuum. The ambient pressure and/or the manifold pressure may be measured. Additionally, the method may assume that the ambient pressure is equal to a predetermined value (101 kPa). Alternatively, the method may estimate the ambient pressure based on other environmental conditions such as ambient temperature and/or elevation.

The method may estimate a mass flow rate of air flowing through the ventilation system based on the engine vacuum. The method may then determine the amount of airflow through the ventilation system based on the mass flow rate of air flowing through the ventilation system and the corresponding period. The method may determine that the mass flow rate of air flowing through the ventilation system increases when the engine vacuum increases. The method may determine that the mass flow rate of air flowing through the ventilation system decreases when the engine vacuum decreases. In various implementations, the method may measure the mass flow rate of air flowing through the ventilation system using a mass flow rate sensor disposed in the ventilation system. For example, a mass flow rate sensor may be disposed in a vent line through which intake air flows from an intake system of the engine to the crankcase.

At 310, the method determines whether additional fresh intake airflow through the ventilation system is required. The method may compare an actual amount of airflow through the ventilation system during the first period to a desired amount and determine that additional airflow is required when the actual amount is less than the desired amount. If additional intake airflow through the ventilation system is required, the method continues at 312. Otherwise, the method continues at 314. At 314, the method waits for a third period (e.g., 30 seconds) before continuing at 310.

The method may determine the desired amount of airflow based on environmental conditions such as ambient temperature and ambient humidity. The method may increase the desired amount of airflow when the ambient temperature decreases and/or when the ambient humidity increases. The method may decrease the desired amount of airflow when the ambient temperature increases and/or when the ambient humidity decreases.

The method may determine the desired amount of airflow based on an amount of engine wear and/or a number of hours of engine operation after a most recent oil change. The method may increase the desired amount of airflow when the amount of engine wear increases and/or when the number of hours of engine operation after the most recent oil change increases. The method may use a total number of hours of engine operation as an approximation of the amount of engine wear.

The method may determine the desired amount of airflow through the ventilation system based on a level of nitrogen oxide within the crankcase. The method may adjust the desired amount of airflow through the ventilation system to maintain the nitrogen oxide level less than a predetermined level (e.g., 500 ppm). For example, the method may increase the desired amount of airflow to a value that is greater than the actual amount of airflow through the ventilation system when the nitrogen oxide level is greater than the predetermined level.

The method may estimate the nitrogen oxide level based on an amount of nitrogen oxide that enters the crankcase due to blowby and an amount of nitrogen oxide that exits the crankcase through the ventilation system. The method may estimate the amount of nitrogen oxide that enters the crankcase based on engine load and/or engine speed, as well as the corresponding period(s). The method may estimate the amount of nitrogen oxide that exits the crankcase based on the amount of airflow through the ventilation system.

The method may determine the engine load based on a driver input (e.g., an accelerator pedal position, a cruise control setting), a mass flow rate of air in the intake system of the engine, a throttle position, and/or a fueling rate. The method may determine that the engine load increases when the mass flow rate increases, when a change in the throttle position corresponds to a throttle area increase, and/or when the fueling rate increases. Conversely, the method may determine that the engine load decreases when the mass flow rate decreases, when a change in the throttle position corresponds to a throttle area decrease, and/or when the fueling rate decreases.

At 312, the method determines whether the engine is able to provide additional fresh intake airflow through the ventilation system. The engine may be unable to provide additional intake airflow when the engine is under a moderate load, such as when a vehicle is climbing a, moderate incline. In such conditions, the throttle may be at or near wide open throttle, and therefore activating cylinders may not provide a significant amount of additional airflow through the ventilation system. The method may determine (e.g., predict) whether the engine is able to provide additional fresh intake airflow based on engine load. If the engine is able to provide additional fresh intake airflow through the ventilation system, the method continues at 316. Otherwise, the method continues at 318. At 318, the method waits for a fourth period (e.g., 10 seconds) before continuing at 312.

At 316, the method activates one or more of the deactivated cylinders of the engine. For example, for a four-cylinder engine operating with two activated cylinders and two deactivated cylinders, the method may activate the two deactivated cylinders. In some cases, the method may activate less than all of the deactivated cylinders of the engine. The method may activate a number of cylinders that corresponds to the additional amount of airflow through the ventilation system that is required. At 320, the method waits for a fifth period (e.g., from 2 to 3 minutes) before continuing at 322. The first period, the second period, the third period, the fourth period, the first amount, second amount, and/or the desired amount may be predetermined. Alternatively, one or more of these periods and amounts may be determined based on environmental conditions and engine wear factors such as those discussed above.

At 322, the method determines whether the engine can satisfy the driver torque request while cylinder(s) are deactivated. If the engine can satisfy the driver torque request while the cylinder(s) are deactivated, the method continues at 324. Otherwise, the method continues at 304. At 324, the method deactivates the cylinder(s).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A system comprising:
an airflow determination module that determines an amount of airflow through a ventilation system for a crankcase of an engine; and
a cylinder activation module that compares the amount of airflow through the ventilation system to a first amount of airflow and, when a cylinder of the engine is deactivated while the engine is running, selectively activates the cylinder when the amount of airflow through the ventilation system is less than the first amount of airflow.

2. The system of claim 1 further comprising a nitrogen oxide (NOx) estimation module that estimates a level of nitrogen oxide within the crankcase of the engine based on the amount of airflow through the ventilation system, wherein the cylinder activation module selectively activates the cylinder based on the nitrogen oxide level.

3. The system of claim 1 wherein the cylinder activation module activates the cylinder when the amount of airflow through the ventilation system is less than the first amount of airflow for a first period.

4. The system of claim 3 further comprising a desired airflow module that determines a desired amount of airflow through the ventilation system, wherein the cylinder activation module selectively activates the cylinder when the amount of airflow through the ventilation system during the first period is less than the desired amount of airflow.

5. The system of claim 4 wherein the desired airflow module determines the desired amount of airflow through the ventilation system based on ambient temperature, ambient humidity, and engine wear.

6. The system of claim 4 wherein the desired airflow module determines the desired amount of airflow through the ventilation system based on a level of nitrogen oxide within the crankcase of the engine.

7. The system of claim 6 further comprising a nitrogen oxide (NOx) estimation module that estimates the nitrogen oxide level based on an amount of nitrogen oxide that enters the crankcase due to blowby and an amount of nitrogen oxide that exits the crankcase through the ventilation system.

8. The system of claim 7 wherein the NOx estimation module estimates the amount of nitrogen oxide that enters the crankcase due to blowby based on engine load.

9. A system comprising:
an airflow determination module that determines an amount of airflow through a ventilation system for a crankcase of an engine; and
a cylinder activation module that, when a cylinder of the engine is deactivated while the engine is running, selectively activates the cylinder when the amount of airflow through the ventilation system is less than a first amount of airflow for a first period, wherein:
the airflow determination module predicts the amount of airflow through the ventilation system when the cylinder is activated; and
the cylinder activation module activates the cylinder when the predicted amount of airflow through the ventilation system is greater than a second amount of airflow.

10. The system of claim 9 wherein the airflow determination module determines the predicted amount of airflow through the ventilation system based on engine load.

11. A method comprising:
determining an amount of airflow through a ventilation system for a crankcase of an engine;
comparing the amount of airflow through the ventilation system to a first amount of airflow; and
when a cylinder of the engine is deactivated while the engine is running, selectively activating the cylinder when the amount of airflow through the ventilation system is less than the first amount of airflow.

12. The method of claim 11 further comprising:
estimating a level of nitrogen oxide within the crankcase of the engine based on the amount of airflow through the ventilation system; and
selectively activating the cylinder based on the nitrogen oxide level.

13. The method of claim 11 further comprising activating the cylinder when the amount of airflow through the ventilation system is less than the first amount of airflow for a first period.

14. The method of claim 13 further comprising:
determining a desired amount of airflow through the ventilation system; and
selectively activating the cylinder when the amount of airflow through the ventilation system during the first period is less than the desired amount of airflow.

15. The method of claim 14 further comprising determining the desired amount of airflow through the ventilation system based on ambient temperature, ambient humidity, and engine wear.

16. The method of claim 14 further comprising determining the desired amount of airflow through the ventilation system based on a level of nitrogen oxide within the crankcase of the engine.

17. The method of claim 16 further comprising estimating the nitrogen oxide level based on an amount of nitrogen oxide that enters the crankcase due to blowby and an amount of nitrogen oxide that exits the crankcase through the ventilation system.

18. The method of claim 17 further comprising estimating the amount of nitrogen oxide that enters the crankcase due to blowby based on engine load.

19. A method comprising:
  determining an amount of airflow through a ventilation system for a crankcase of an engine;
  when a cylinder of the engine is deactivated while the engine is running, selectively activating the cylinder when the amount of airflow through the ventilation system is less than a first amount of airflow for a first period;
  predicting the amount of airflow through the ventilation system when the cylinder is activated; and
  activating the cylinder when the predicted amount of airflow through the ventilation system is greater than a second amount of airflow.

20. The method of claim 19 further comprising determining the predicted amount of airflow through the ventilation system based on engine load.

* * * * *